United States Patent [19]
Gunn et al.

[11] 3,753,089
[45] Aug. 14, 1973

[54] ELECTRONIC SWITCHING TRANSIENT DETECTOR AND METHOD FOR LOCATING ELECTRICAL POWER SUPPLY NOISE SOURCES

[75] Inventors: John B. Gunn, Mount Kisco; John L. Staples, Pleasantville, both of N.Y.

[73] Assignee: International Business Machines Corporation, Armonk, N.Y.

[22] Filed: Dec. 6, 1971

[21] Appl. No.: 204,881

[52] U.S. Cl.................. 324/52, 324/127, 324/133
[51] Int. Cl...................... G01r 19/14, G01r 31/08
[58] Field of Search ................ 324/52, 66, 67, 103, 324/127, 133

[56] References Cited
UNITED STATES PATENTS

| | | | |
|---|---|---|---|
| 2,808,566 | 10/1957 | Douma | 324/127 |
| 689,253 | 12/1901 | Varley | 324/52 |
| 2,775,736 | 12/1956 | Pies et al. | 324/67 X |
| 2,789,268 | 4/1957 | Bechtel et al. | 324/66 |
| 1,344,388 | 6/1920 | Eisenmann | 324/133 |

*Primary Examiner*—Gerard R. Strecker
*Attorney*—George Baron

[57] ABSTRACT

A procedure is described for locating the source of electrical noise generated in any branch of an electrical power distribution network. A noise probe, consisting of a small coil mounted in an insulated housing which is held near a power supply line to inductively couple to the magnetic field of the noise current present in that line, is employed to find the source of electrical noise.

4 Claims, 5 Drawing Figures

INVENTORS
JOHN B. GUNN
JOHN L. STAPLES

BY *George Baron*

ATTORNEY

ELECTRONIC SWITCHING TRANSIENT DETECTOR AND METHOD FOR LOCATING ELECTRICAL POWER SUPPLY NOISE SOURCES

BACKGROUND OF THE INVENTION

This invention relates to apparatus and a method of using such apparatus so as to enable one to locate the source of electrical noise generated within a power substation distribution system and power lines being fed by such substation. Power line noise is a source of trouble in areas, such as a research laboratory or at any location, where sensitive electrical measurements are being made. Most known prior techniques for establishing a noise-free environment are time consuming and tedious, particularly when several noise sources may be operating simultaneously. The present invention relies upon a simple yet direct and efficient way of detecting each source of generated noise that comprises a coil mounted in an insulated housing. The coil is inductively coupled to the magnetic field of the noise current present in a conductor and such coil is designed to eliminate electrostatic coupling and minimize 60 cycle inductive coupling. The coil housing is marked or has an arrow affixed to it to indicate the current sense for a positive electromotive force induced by the noise pulse in the coil. The direction in the conductor from which the noise is coming is determined by comparing the sense of the current pulses in the conductor with the sense of the corresponding voltage pulses. When the polarity of the voltage pulse on the conductor is the same as that induced in the coil by the noise current in the conductor, the arrow on the housing has been chosen to be pointing toward the source of line noise. By judiciously choosing measuring points along a noise-carrying line, the choice being based on the direction noted in the previous readings, the source of interfering noise can be quickly located. After such location, corrective measures, such as the use of electrical filters at the offending noise source, will prevent future propagation of noise from the source back into the power distribution system.

It is an object of this invention to provide a simple but effective means for pinpointing the source of electrical noise being generated at a power substation or in any line emanating from that power substation.

It is another object to provide a direction-finding noise probe and associated electronic circuitry that is readily portable.

It is a further object to provide a portable direction-finding noise detector probe in conductors having high noise levels.

The foregoing and other objects, features and advantages of the invention will be apparent from the following more particular description of a preferred embodiment of the invention as illustrated in the accompanying drawing.

DESCRIPTION OF THE PREFERRED EMBODIMENT

Figure 2:
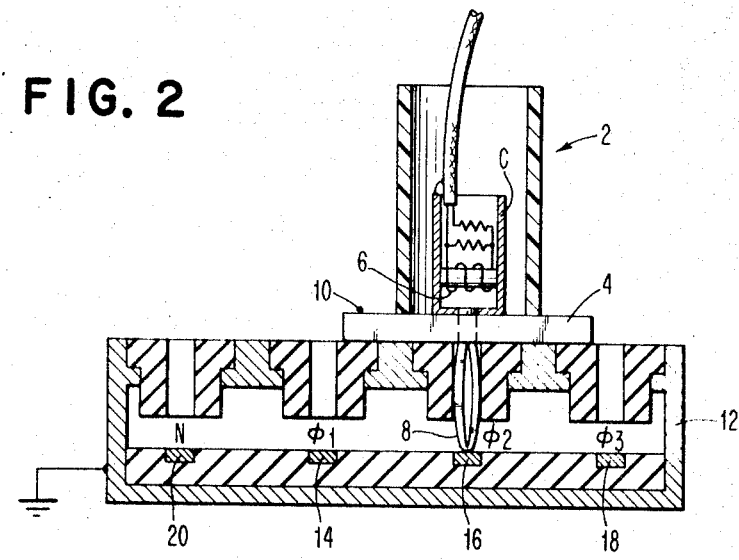
FIG. 2 is a cross-sectional view of the probe itself and its housing in operation as a test device.

In FIG. 2 is shown the basic probe 2 encased in and supported by an insulating housing 4. Probe 2 includes a small coil 6 mounted in an electrostatically shielded compartment C in the insulated housing 4 so that the coil, when placed near a conductor, is inductively coupled to the magnetic field of any noise current present in that conductor, and a voltage pickup lead 8 which is in electrical contact with the conductor for sensing the polarity of the noise voltage on the conductor. The housing 4 is marked with an arrow 10 which is used in determining the direction of the noise source. In this illustration, the arrow will be pointing either into the plane of the drawing or out of the plane of the drawing. That is, the initial orientation of coil 6 and the manner in which it is connected to an oscilloscope, to be discussed hereinafter, are such that when a positive noise voltage polarity sensed by voltage pickup lead 8 is accompanied by a positive current sense output, then the arrow 10 is pointing toward the noise source, and when a positive noise voltage is accompanied by a negative current output, then the arrow 10 is pointing away from the noise source.

Before describing the circuitry employed in determining noise sources in a conductor, attention is drawn to FIG. 2 wherein an example of a three phase power bus duct 12 is shown. The duct 12 is grounded and has three conductors 14, 16 and 18 carrying the different phase currents $\phi_1 \phi_2$ and $\phi_3$ with the fourth conductor 20 being neutral. To take a reading of suspected noise currents on a line, terminal 60 is grounded to the bus duct, the insulated housing 4 rests on one of the openings in bus duct 12, in proximity to a power conductor, such as conductor 16, with voltage pickup probe lead 8 contacting the conductor 16 and the coil 6 being under the magnetic influence of noise currents flowing through that conductor. The one using the probe 2 has the arrow 10 in his view while the test is being made.

Figure 1:
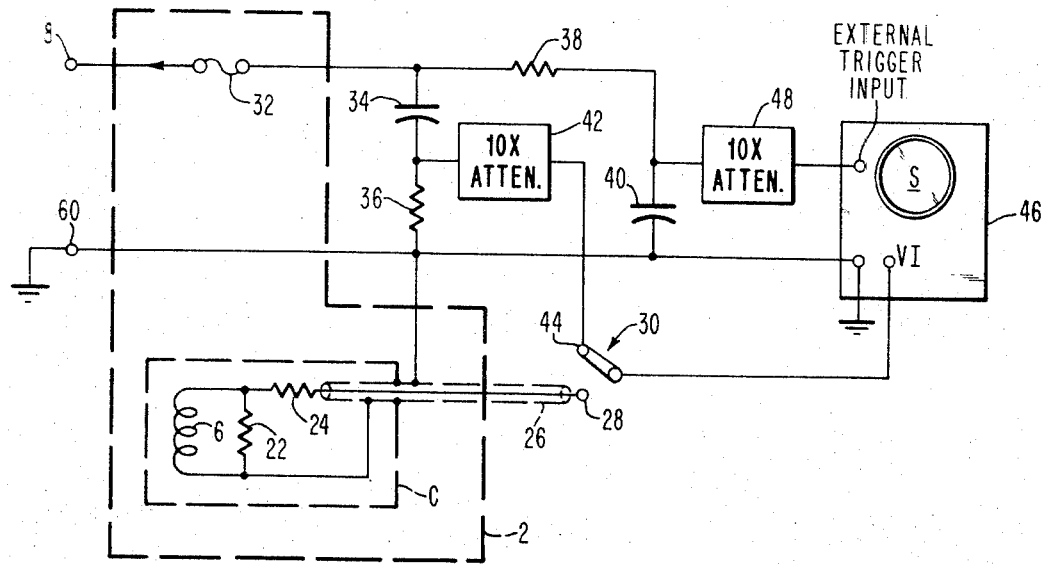
FIG. 1 is a diagrammatic representation of the invention showing the probe and its associated electronic circuitry.

Attention is directed to FIG. 1 to illustrate the manner in which an actual noise detection test is made. The enclosure C serves as an electrostatic shield, shown as a dotted rectangle, in which is carried the coil 6. Resistor 22 is in electrical parallel with coil 6 and resistor 24 is in series with coil 6. One end of coil 6 is grounded through shielded cable 26 and the other end of said coil terminates through resistor 24 at one of the terminals 28 of switch 30.

The voltage pickup lead 8 connects to ground, through fuse 32 and two parallel R-C networks, the first consisting of capacitor 34 and resistor 36 and the second consisting of resistor 38 and capacitor 40. An attenuator circuit 42 connects the voltage picked up by lead 8 and differentiated by capacitor 34 and resistor 36 through terminal 44 and switch 30 to the vertical input (VI) of a portable oscilloscope 46. The particular scope used in implementing the invention is the Sony-Tektronix 323. A second attenuator circuit 48 is connected from the second R-C circuit to the external trigger input terminal of oscilloscope 46.

Coil 6 has an inductance of 50 millihenries, resistor 22 has a resistance of a thousand ohms and resistor 24 a resistance of 2,000 ohms so that the noise induced current in such coil masks the current induced by the 60 cycle wave from the power line. Resistors 22 and 24 serve as damping resistors and coil 6 and resistor 22 form a high pass filter suppressing the 60 cycle current signals on the line being probed. In a similar manner; capacitor 34 has a value of 0.02 μfd and resistor 36 has a resistance of 1,000 ohms so that such R-C circuit acts as a high pass filter or differentiator allowing only the noise voltage to be transmitted to the oscilloscope and suppressing the normal 60 cycle power line voltage. This circuitry thus emphasizes the spikes, i.e., line noise, sensed by voltage pickup lead 8 and diminishes the normal sine wave signals on the line. In a similar manner, resistor 38 has a value of 10,000 ohms and capacitor 40 a value of 0.1 μfd so that the combined R-C circuit is a filter of high frequency noise pulses but allows the 60 cycle sine wave from the power line to pass through attenuator circuit 48 to the external trigger input of oscilloscope 46. This trigger network provides a smoothed 60 cycle sine wave from the power line which allows triggering of the time base of the oscilloscope 46 to display noise pulses on an expanded time scale over most of the power line cycle. The balance of the power line cycle may be studied using the horizontal position control of the oscilloscope.

Thus when probe 2 is inserted in a power line, as seen in FIG. 2, the circuit of FIG. 1 can be made to alternately display the polarity of the noise voltage $v_n$ and the polarity of the noise current $i_n$ by switching the arm of switch 30 back and forth from terminal 44 to terminal 28. The oscilloscope 46 will alternately display the polarity of the $v_n$ and $i_n$ on its screen. The probe has been calibrated so that if both such polarities are the same, then the arrow 10 on housing 4 is pointing towards the noise source. If the polarities are of opposite sense, then the housing 4 in which the probe is housed in rotated 180° so that the polarities match and arrow 10 is again pointing toward the source of noise on the line.

Figure 5:
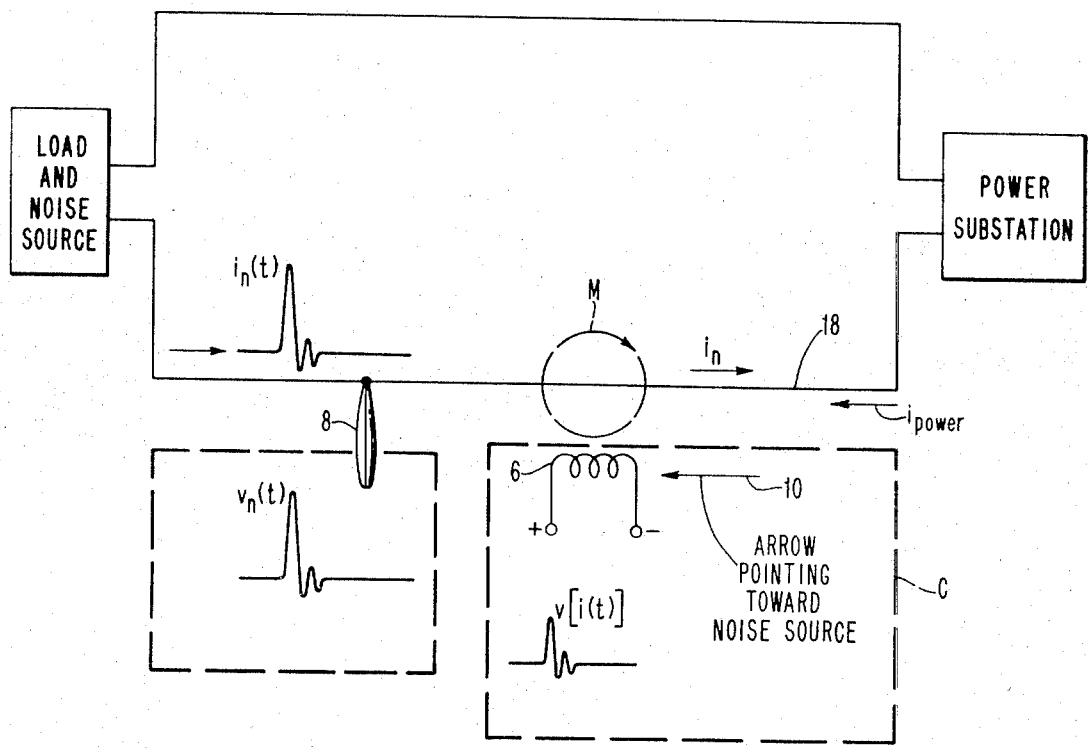
FIG. 5 is a schematic showing of the manner in which the arrow on the probe housing is made to point in the direction of the noise source.

FIG. 5 illustrates how such a calibration is carried out. A substation delivers power along a conductor 18 to a load, and it is assumed that the latter is a source of electrical noise which travels as noise pulse $i_n(t)$ from the load back toward the substation. Voltage probe 8 senses this noise as $v_n(t)$. The noise current $i_n$ generates a magnetic field M around conductor 18 so that such field M is coupled to coil 6, the latter being wound so that such noise current $i_n$ induces a positive voltage $v[i(t)]$ at the left terminal of coil 6. Fixed arrow 10 on the housing 4 is marked to point toward the direction of the noise source when $v_n(t)$ has the same polarity as $v[i_n(t)]$. Obviously, the calibration could be turned around so that when the polarity of $v_n(t)$ is opposite to that of $v[i_n(t)]$, the fixed arrow 10 points toward the source of noise without departing from the spirit of the invention.

Figure 4:
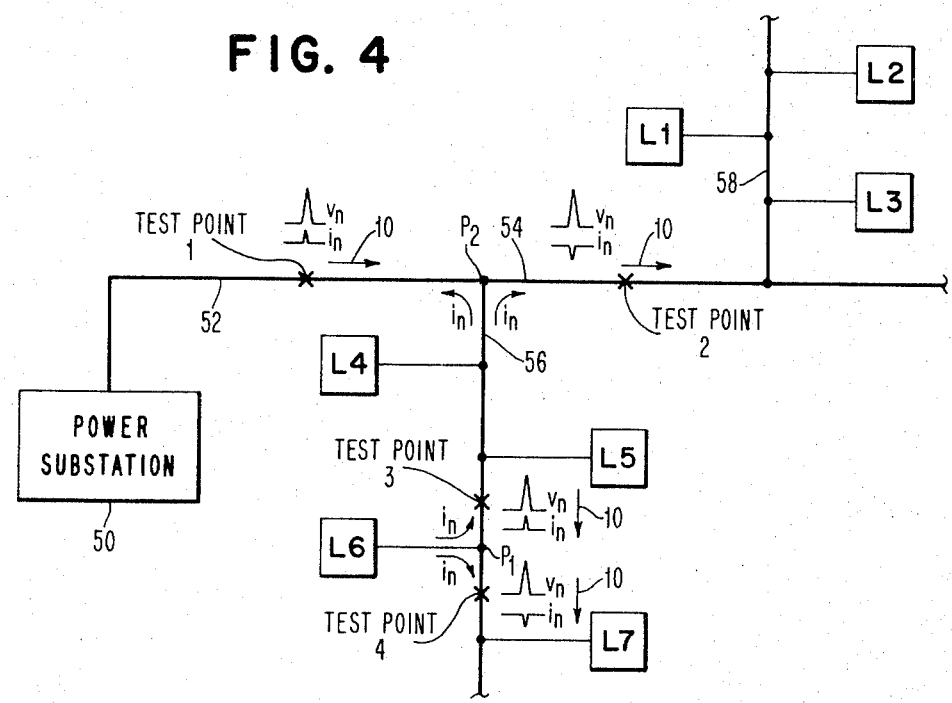
FIG. 4 is a schematic diagram of a flow diagram illustrating noise pulses on power lines and how the invention is used to detect them.

FIG. 4 is a schematic representation of the manner in which the test probe is used to pinpoint the location of noise in a network of conductors feeding power to various loads. Assume that box 50 represents a power substation, lines 52, 54, and 56, etc. represent various power bus ducts 12 and boxes $L_1, L_2, \ldots L_7$ represent many loads, such as laboratories and testing stations employing many electronic devices, some of the latter acting as generators of noise pulses which propagate in both directions along the power bus to which the equipment is electrically connected. Thus, if station $L_6$ is generating noise, such noise will propagate above and below line 56 away from point $P_1$ and affect all other stations.

Figure 3:
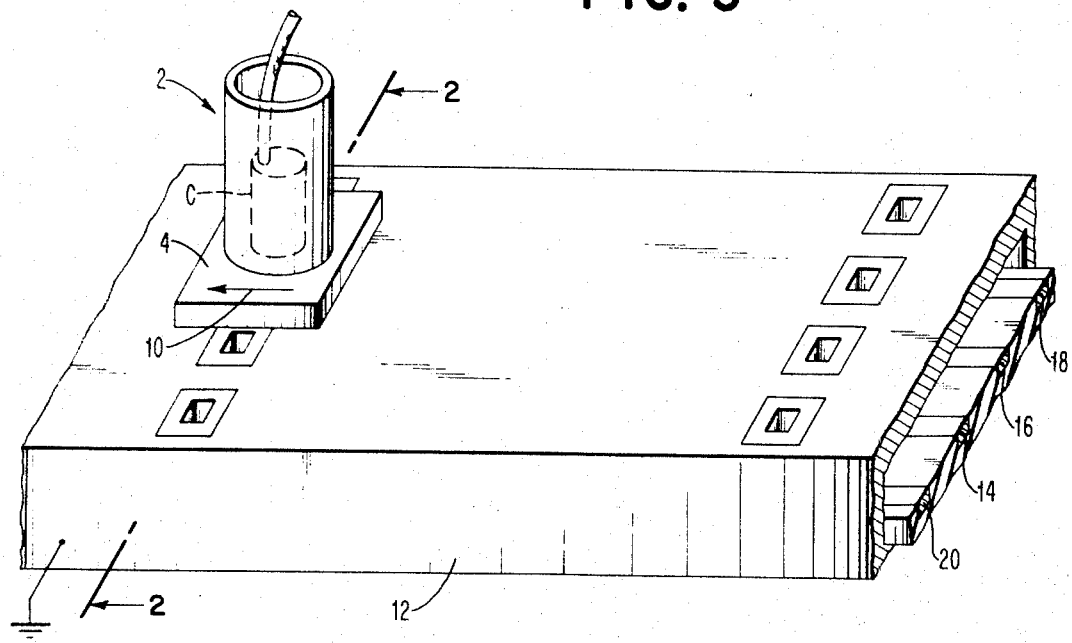
FIG. 3 is a perspective view of the probe and housing used in FIGS. 1 and 2.

Assume that Test Point No. 1 is chosen on a power line suspected of carrying noise pulses. The housing 4 of the probe 2 is inserted at an access port in the power bus duct (See FIG. 3) and switch 30 (See FIG. 1) is switched back and forth between terminals 28 and 44 to obtain a reading of a noise pulse $v_n$ and, if such exists, its corresponding current pulse $i_n$. If the polarities of $v_n$ and $i_n$ are of the same sence, as indicated in FIG. 4, then the fixed arrow 10 on the insulated housing 4 is pointing toward (to the right) the source of noise on line 52. If these polarities are of an opposite sense, then the housing a is rotated 180° to indicate that the source of noise is somewhere to the left of test point No. 1.

The probe 2 is moved to the right along duct 52, until point $P_2$ is reached, the latter point being the junction of three ducts 52, 54, and 56. The testing may continue either along duct 54 or 56. In the instant case, the probing continued along duct 54, and $v_n$ and $i_n$ were constantly monitored by oscilloscope 46. Soon after point $P_2$ was passed, the sense of polarity of $i_n$ was negative and that of $v_n$ was positive. Consequently, arrow 10 on housing 4 was pointing away from the noise source, and the noise source must be located along bus duct 56. Tests are continued along bus duct 56 until the change in polarity of $i_n$ between test point No. 3 and test point No. 4 indicates the source of noise as being located in station $L_6$. By study of the nature of the equipment used at location $L_6$ and the type of noise spikes being generated, corrective measures can be taken to eliminate the cause of noise. For example, by selectively switching off individual suspected pieces of equipment at location $L_6$ and continuing to monitor the noise or its absence from location $L_6$, the specific source of noise can be isolated. Appropriate measures, such as the use of filters, shields replacement of parts of the offending equipment, etc. may be resorted to so as to attenuate or eliminate the noise, but such measures are not part of the instant invention and will not be discussed herein.

This invention is particularly useful when the noise pulses occur in a definite pattern, frequently betraying the fact that a particular type of equipment is responsible for the noise spikes. In general, as happens often when many substations are used, each power line phase from a particular substation has a different pattern of pulses which propagates throughout the distribution system with little change in amplitude, or such definite pattern appears which is characteristic of particular equipment. This information, when added to the information obtained by the method of this invention, can greatly reduce the time needed for locating noise sources in a complex electrical network.

The invention, while described as a means of detecting repetitive noise spikes, is not so restricted. The thrust of the contribution lies in comparing the polarity sense of the noise voltage pulses with the polarity sense of current induced voltage in coil 6 by such noise pulses, with the arrow 10 on housing 4 determining the direction of noise source. If the noise spikes are transient, and random, then a memory unit can be employed in conjunction with this invention to retain the polarity sense of that transient and random pulse. Changes in $i_n$ with respect to $\nu_n$ can be observed in this memory unit and the procedure for locating the noise source is the same as that for repetitive pulses.

This invention is particularly helpful where a given substation supplies many locations, for example, about 100 or more laboratories situated on different floors. Unless a relatively simple and reliable method is relied upon to trace the origin of a noise-generating electrical source, the time consumed would be enormous. The novel method described herein is a quick and direct technique for locating the direction in which a noise pulse is traveling through a power system and permits one to pinpoint, by using a few judiciously chosen test points, the exact location of the offending noise generator.

What is claimed is:

1. A direction-finding noise probe for locating the source of electrical noise in an electrical network having a plurality of branch circuits comprising an insulated housing having a fixed arrow marking on said housing,
   a voltage pickup probe on said housing for coupling directly to said noise voltage at a selected point in said network so as to produce a reference noise voltage polarity,
   an electromagnetic coil within said housing inductively coupled to the magnetic field of the noise pulse current present in said network at said selected point in the network so as to induce a voltage polarity of said noise current pulse in said coil,
   means for sensing said reference voltage polarity,
   means for sensing the polarity of said induced noise current pulse, and
   means for comparing said two polarities whereby said fixed arrow points in the direction of noise source in said network when said polarities are equal and away from said noise source when said polarities are unequal.

2. A direction-finding noise probe for locating the source of electrical noise in an electrical network having a plurality of branch circuits comprising an insulated housing having a fixed arrow marking thereon,
   an electromagnetic coil within said housing for being inductively coupled to the magnetic field created by a noise current pulse present in a conductor of one of said branch circuits so as to produce a noise voltage pulse of a given polarity in said coil;
   means for sensing the polarity of said noise-induced voltage in said coil,
   a voltage pickup lead on said housing for sensing the voltage polarity of said electrical noise pulse, and
   means for displaying said two polarities whereby said fixed arrow points in the direction of origin of said noise pulse in said conductor when said polarities are equal and away from the origin of said noise pulse when said polarities are unequal.

3. A direction-finding noise probe for locating the source of electrical noise in an electrical network having a plurality of branch circuits comprising an insulated housing having a fixed direction-pointing marker thereon,
   a voltage pickup probe on said housing for coupling directly to said noise voltage at a selected point in said network so as to produce a reference voltage polarity,
   an electromagnetic coil within said housing inductively coupled to the magnetic field of the noise pulse current present in said network at said selected point in the network so as to induce a voltage polarity of said noise current pulse in said coil,
   means for sensing both the polarity of said reference voltage and said induced noise current pulse,
   an oscilloscope, having a triggering circuit, for displaying said two polarities on its screen, and
   a differentiating network connected between said voltage probe and said triggering circuit so that the noise voltage pulse is emphasized and the normal sine wave voltage on said conductor is diminished in the display of said polarities.

4. In a method for detecting the source of electrical noise in an electrical network having a plurality of branch circuits comprising the steps of:
   a. simultaneously sensing the current and voltage of that electrical noise on a given branch circuit, wherein similar polarities of the noise voltage and noise current indicate that the source of noise is coming from a given direction,
   b. continuing sensing said noise pulse in said branch circuit, while moving said probe in said given direction, until the polarity of the noise current pulse reverses with respect to the polarity of the noise voltage pulse, said reversal of polarity indicating a first branch circuit that is a source of electrical noise,
   c. continuing sensing said noise pulse along said first branch circuit until the polarity of the induced noise current pulse is opposite to the polarity of the induced noise voltage pulse so as to locate a second branch circuit that is a source of electrical noise, and
   d. continuing similar sensing of the noise pulse until a final circuit, having no further branches associated therewith, is located as the generator of such electrical noise.

* * * * *